Patented Mar. 16, 1937

2,073,686

UNITED STATES PATENT OFFICE 2,073,686

MANUFACTURE OF FATTY ACID ANHYDRIDES

Henry Dreyfus, London, England

No Drawing. Application May 4, 1932, Serial No. 609,252. In Great Britain July 15, 1931

8 Claims. (Cl. 260—123)

This invention relates to the manufacture of fatty acid anhydrides and particularly acetic anhydride.

I have now found that acetic anhydride can be produced by subjecting acetates of metals of low basicity to thermal decomposition. By metals of low basicity I mean metals such as copper, tin, nickel, silver, chromium, mercury, the acetates of which normally yield no acetone or unsubstantial quantities of acetone on heating. The acetates of copper or chromium, such for example as cupric acetate or chromic acetate, are especially suitable for the purposes of the invention.

The decomposition of the invention may advantageously be performed in presence of more acidic salts such as salts of strong mineral acids and especially sulphates, chlorides and the like and particularly sulphates, chlorides and the like of the metals of low basicity.

To conserve the highest possible yields of anhydride and avoid loss of anhydride through hydrolysis to acetic acid the acetates should be employed in anhydrous form, i. e. free or substantially free from water of crystallization, or the water of crystallization should be removed as completely as possible before subjecting the acetates to the decomposition of the invention. Likewise the acid salts, where such are employed, should be employed in anhydrous form particularly if the acetates to be decomposed in admixture therewith are not in anhydrous form. Preferably when mixtures of acid salts and acetates are employed both acid salts and acetates are employed in anhydrous form. Where necessary the substances to be employed in the decomposition may be subjected to any convenient process for removal of water prior to the decomposition. Thus, for instance, such removal may be effected by heating, preferably over sulphuric acid or in a current of gas or vapor or under reduced pressure. For such heating, excessive temperatures liable to cause decomposition of the acetate should be avoided. For this reason I preferably employ temperatures below about 200° C. when effecting water removal from the acetates or their mixtures with the acid salts. In cases where acid salts are to be employed and it is desired or necessary to remove water therefrom it is often advantageous to effect such removal prior to admixture with the acetate. For instance, with copper sulphate for complete dehydration of the copper sulphate temperatures (about 240° C.) are requisite that are liable to cause premature decomposition of an acetate such as copper acetate.

I preferably employ the acetates in the form of the normal salts as distinct from the basic acetates and as above indicated, I preferably employ mixtures of the acetates with more acidic salts such as the sulphates or chlorides of the metal present in the particular acetate.

The decomposition of the acetates or mixtures thereof with the more acidic salts can be effected in any convenient way. For instance, the acetates or the said mixtures may be simply heated; or, for instance, they may be heated in a current of air, nitrogen, carbon dioxide or other indifferent gas or in a current of an indifferent vapor, such, for instance, as benzol, or petroleum ether, or in a stream of acetic acid. The heating may be performed at any temperature sufficient to decompose the acetate, temperatures of between about 200° C. and 450° C., and particularly between about 250° C. and 320° C., being especially suitable for this purpose. Excessive temperatures liable to cause destruction of the anhydride should, of course, be avoided, especially in cases where the decomposition is performed in absence of a stream or current of gas or vapor.

The decomposition may be performed at ordinary atmospheric pressure or under increased pressure or under decreased pressure or "vacuum"; preferably it is performed under reduced pressure.

The residue from the decomposition may, if desired, be treated with acetic acid to form further acetate which may be subjected to the decomposition of the invention. Preferably the residue is subjected to oxidation to oxidize any metal present prior to treatment with acetic acid, for instance, subsequent to the decomposition if desired a stream of air or the like may be passed over the heated residue in the decomposer, or, for instance, the residue may be simply withdrawn from the decomposer into contact with air while still substantially at the decomposition temperature.

If instead of the acetates there are employed the salts of higher fatty acids, such for instance as the propionates or butyrates or substituted fatty acids such as methoxy acetic acid, the corresponding higher fatty acid anhydrides or substituted fatty acid anhydrides can readily be obtained by means of the invention.

The following example serves to illustrate a convenient form of execution of the invention, it being understood that it is given solely by way of illustration and is in no way limitative.

*Example*

Crystalline cupric acetate is dried by heating to 140° C. until water removal at that temperature is substantially complete and subjected to further drying under vacuum at about 105° C. to remove residual water as far as possible. The dried salt is then mixed with 30 to 60% of its weight of anhydrous copper sulphate. The mixture is then subjected to decomposition at a temperature of about 250° to 270° C. under an absolute pressure of about 10 to 15 mm. The vapors resulting from the decomposition are subjected to condensation. If desired, the crude anhydride so obtained may be subjected to fractional distillation to obtain it in as pure a form as possible.

What I claim and desire to secure by Letters Patent is:—

1. A process for the manufacture of lower fatty acid anhydrides, which comprises subjecting to thermal decomposition a lower fatty acid salt of a metal whose acetate, on heating, normally yields at most unsubstantial quantities of acetone, in association with a salt of the same metal with a strong mineral acid selected from the group consisting of hydrochloric acid and sulphuric acid.

2. A process for the manufacture of acetic anhydride, which comprises subjecting to thermal decomposition a metal acetate which, on heating, normally yields at most unsubstantial quantities of acetone, in association with a salt of the same metal with a strong mineral acid selected from the group consisting of hydrochloric acid and sulphuric acid.

3. Process for the manufacture of acetic anhydride, which comprises subjecting cupric acetate to thermal decomposition in association with a copper salt of a strong mineral acid selected from the group which consists of hydrochloric acid and sulphuric acid.

4. Process for the manufacture of acetic anhydride, which comprises subjecting chromic acetate to thermal decomposition in association with a chromium salt of a strong mineral acid selected from the group consisting of hydrochloric acid and sulphuric acid.

5. Process for the manufacture of acetic anhydride, which comprises heating to a temperature between 200° and 450° C. a mixture of cupric acetate with a copper salt of a strong mineral acid selected from the group consisting of hydrochloric acid and sulphuric acid.

6. Process for the manufacture of acetic anhydride, which comprises heating to a temperature between 200° and 450° C. a mixture of chromic acetate with a chromium salt of a strong mineral acid selected from the group consisting of hydrochloric acid and sulphuric acid.

7. Process for the manufacture of acetic anhydride, which comprises heating to a temperature between 250° and 320° C. a mixture of cupric acetate with a copper salt of a strong mineral acid selected from the group consisting of hydrochloric acid and sulphuric acid.

8. Process for the manufacture of acetic anhydride, which comprises heating to a temperature between 250° and 320° C. a mixture of chromic acetate with a chromium salt of a strong mineral acid selected from the group consisting of hydrochloric acid and sulphuric acid.

HENRY DREYFUS.